US 6,724,170 B1

(12) United States Patent
Maggert et al.

(10) Patent No.: US 6,724,170 B1
(45) Date of Patent: Apr. 20, 2004

(54) INTERCONNECT SYSTEM FOR RECHARGEABLE COMPUTER BATTERIES

(75) Inventors: Kevin Maggert, Lawrenceville, GA (US); Charles Friedli, Lawrenceville, GA (US); Due Q. Huynh, Lawrenceville, GA (US); William Kiger, Dacula, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/298,097

(22) Filed: Nov. 16, 2002

(51) Int. Cl.[7] .............................. H02J 7/00; H01M 6/00
(52) U.S. Cl. ........................................ 320/107; 429/161
(58) Field of Search .............................. 320/107, 110, 320/112; D13/103, 107, 108; 307/150; 429/90, 94, 95, 96, 161

(56) References Cited

U.S. PATENT DOCUMENTS

| 4,510,551 A | 4/1985 | Brainard, II | ................ 536/684 |
|---|---|---|---|
| 6,153,834 A | 11/2000 | Cole et al. | ................... 194/260 |
| 6,175,624 B1 | 1/2001 | Brundieck et al. | ...... 379/433.05 |
| 6,225,778 B1 | 5/2001 | Hayama et al. | ............... 520/112 |
| 6,387,566 B1 * | 5/2002 | Chang et al. | ................ 429/161 |
| 6,600,243 B1 * | 7/2003 | Hara et al. | ................... 307/150 |

* cited by examiner

Primary Examiner—Pia Tibbits
(74) Attorney, Agent, or Firm—Philip H. Burrus, IV

(57) ABSTRACT

This invention includes an improved interconnect assembly for use in rechargeable battery packs for laptop computers. The invention eliminates manufacturing defects resulting from the hand soldering processes of the prior art. The assembly provides interconnection for rechargeable cells oriented end to end, in parallel rows. Insulated runners provide interconnection to a bus located along the center of the end to end cells. The bus is a flexible circuit that couples to a printed circuit board. In one preferred embodiment, the bus is less than two inches in diameter and less than the diameters of the parallel rows of end to end cells in length. The assembly eliminates the need for hand soldering, eliminates cumbersome wire routing, and offers multiple insulation features that prevent electrical shorts.

10 Claims, 4 Drawing Sheets

INTERCONNECT SYSTEM FOR RECHARGEABLE COMPUTER BATTERIES

BACKGROUND

1. Technical Field

This invention relates generally to rechargeable batteries for laptop computers, and more specifically to a system for interconnecting cells and circuits within such a rechargeable battery pack.

2. Background Art

Notebook style, or "laptop", computers are becoming more and more popular. Prices for these small, portable computers now rival those of their larger, bulkier desktop model predecessors. Students and business people enjoy the ability to work on their computers while on the go. Manufacturers have even responded to the demand for laptop computers by introducing new products like "tablet" style computers that allow users to write on the screen with a special pen, thereby emulating a tablet of paper.

Laptop computers derive their portability from rechargeable batteries. The rechargeable batteries, from the outside, sometimes resemble interchangeable computer components like CD-ROM or floppy disk drives. One such example is shown in U.S. Design Pat. No. D440201. These designs make the batteries easy to insert into standard bays within the laptop computer.

The inside of these batteries, however, is quite complex. The batteries typically include from six to ten individual cells, coupled in parallel and series combinations. Additionally, these batteries generally include sophisticated circuitry, including battery protection circuits, microprocessor circuits, fuel gauging circuits and charging circuits. These circuits are typically mounted on a rigid printed circuit board. The board may include some form of standard connector that couples to the laptop computer.

A problem exists in that it is difficult to connect the cells, which are often packaged in cylindrical steel cans, to the printed circuit board. By far the most popular way to connect the cells to the board is by hand soldering a flexible wire from a metal tab welded to the can, to the printed circuit board. The problem with this hand soldering method is reliability. If the soldering technician is not diligent, cold solder joints may result, thereby compromising reliability of the battery pack. Additionally, solder balls and bridges may short elements within the battery pack, again compromising reliability.

There is thus a need for an improved interconnect system within computer battery packs.

DETAILED DESCRIPTION OF THE INVENTION

Figure 1:
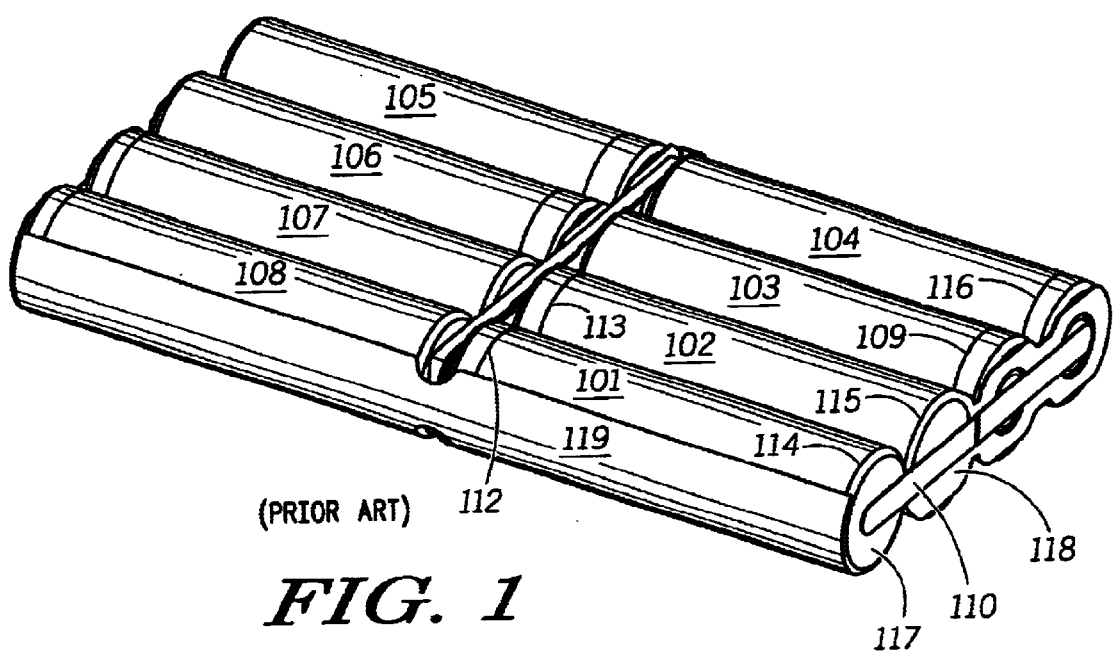
FIG. 1 illustrates a prior art internal battery cell configuration for laptop computer battery packs.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Referring now to FIG. 1, illustrated therein is a typical internal battery cell configuration for laptop computer battery packs. A configuration of this type is typical for battery packs used in computers manufactured by the major computer manufacturers. The invention described herein could be utilized on a variety of different cell types and configurations, but as the configuration of FIG. 1 is one of the most popular being used in laptop computers today, it will be used for exemplary purposes.

The configuration is made of a plurality of rechargeable cells 101–108. These cells 101–108 are generally lithium ion cells, as lithium-based batteries offer extremely high energy densities. The exemplary cells 101–108 shown in FIG. 1 are referred to by the industry as "18–650" cells. The "18" cornes from the 18 mm diameter, and the "650" refers to their 65 mm length. The cells 101–108 have positive and negative terminals, with the positive terminal typically indicated with a crimped ring about the cell. For example, ring 109 indicates the positive end of cell 103. The cells are typically configured in a series-parallel configuration. For example, cells 101 and 102 may be coupled in parallel, coupled serially with the parallel combination of cells 103 and 104, coupled serially with the parallel combination of cells 105 and 106, coupled serially with the parallel combination of cells 107 and 108. The geometric packaging effect is that the cells 101–108 are physically coupled in parallel rows of two cells, e.g. one parallel row is cells 101 and 108, being disposed end to end, coupled in geometric parallel with cells 102,107, cells 103,106, and so on.

Flexible metal tabs are welded to the ends of the cells. For example the positive ends 112, 113 of cells 101,102 may be coupled with a flexible metal tab, while the negative ends 114,115 of cells 101,102 are coupled to the positive ends 109,116 of cells 103,104, by way of flexible metal tab 110. Paper insulators 117,118 are optionally included to ensure that the flexible metal tab 110 does not contact the non-terminal portion of the cell.

End cells, e.g. 104, 105, may be coupled by way of a metal tab, as is the case in this exemplary embodiment. Lead cells, e.g. 101,108, are preferably mechanically coupled by way of a durable adhesive, like Kapton® tape 119.

Prior art solutions would then hand solder wire from a flexible metal tab (like tab 110) to a printed circuit board. As stated above, a myriad of manufacturing and field defects can occur as a result of hand soldering processes. Additionally, hand soldering is slow and labor intensive. Factories seeking to maintain six-sigma quality control are unable to do so with hand soldering processes. This invention provides an inexpensive, efficient interconnect system suitable for welding machines. The invention reduces both cost and manufacturing defects.

Figure 2:
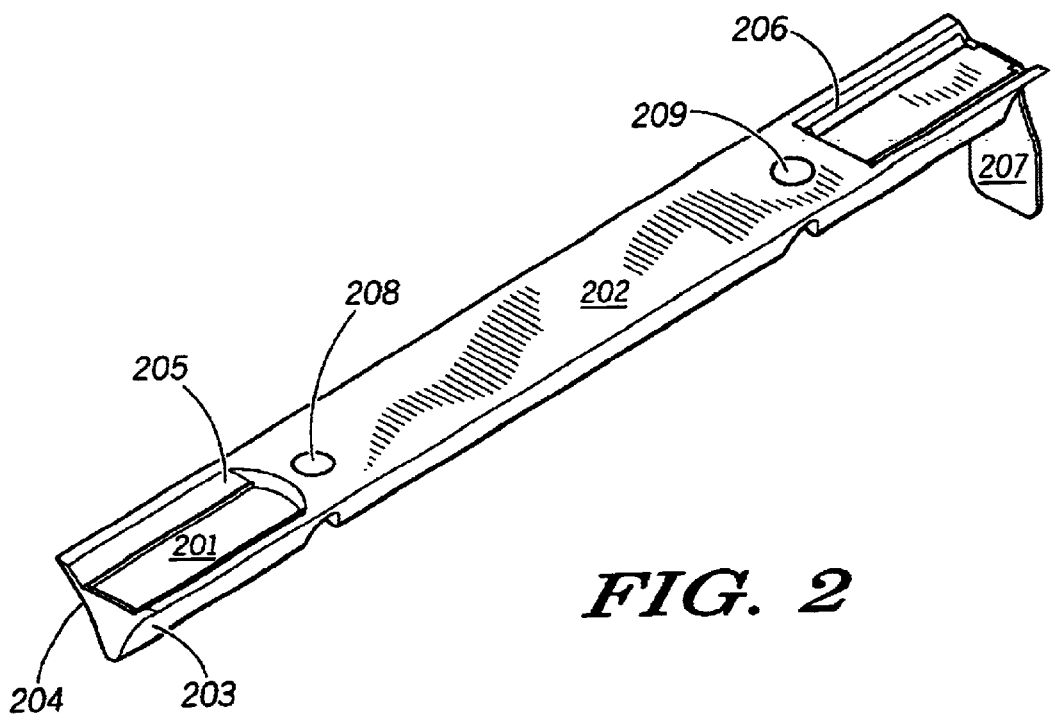
FIG. 2 illustrates the runner in accordance with the invention.

Referring now to FIG. 2, illustrated therein is one component of the interconnect system. This component will be herein referred to as a "runner", as it forms an electrical connection that "runs" from the flexible metal tabs to the bus. The runner includes a plastic casing 202 that encompasses a metal tab 201. The plastic casing 202 is generally triangular in cross section, with two of the sides 203,204 having concave curvatures to mate between pairs of cylindrical cells. By way of example, if 18–650 cells are used, the concave curvatures of sides 203,204 would have 9 mm radii, neglecting tolerances, to accommodate the outer curves of the cell. The plastic housing may be made from any of a number of plastics, including styrene, polystyrene, ABS, polycarbonates and the like. A preferred plastic is Noryl GTX 830.

The flexible metal tab 201 is similar to those used to couple cells together (as in FIG. 1). The flexible metal tab 201 is exposed through two apertures 205,206 in the plastic casing 202. The apertures 205–206 allow machine welding as will be described below. The flexible tab preferably includes a perpendicular member 207 for coupling to the tabs in a battery pack.

There are several manufacturing options available for construction of the runner. A preferred method includes insert molding. In this method, the flexible metal tab 201 is inserted into the cavity of a mold, whereupon molten plastic is injected about the tab 201. Tooling holes 208,209 facilitate plastic flow about the tab 201. Other alternatives include tooling the plastic housing 202 by way of injection molding, and then manually inserting the flexible metal tab 201 into the casing 202. Optional barbs (not shown) in the tab 201 may mate with holes 208,209 to keep the tab 201 in place.

Figure 3:
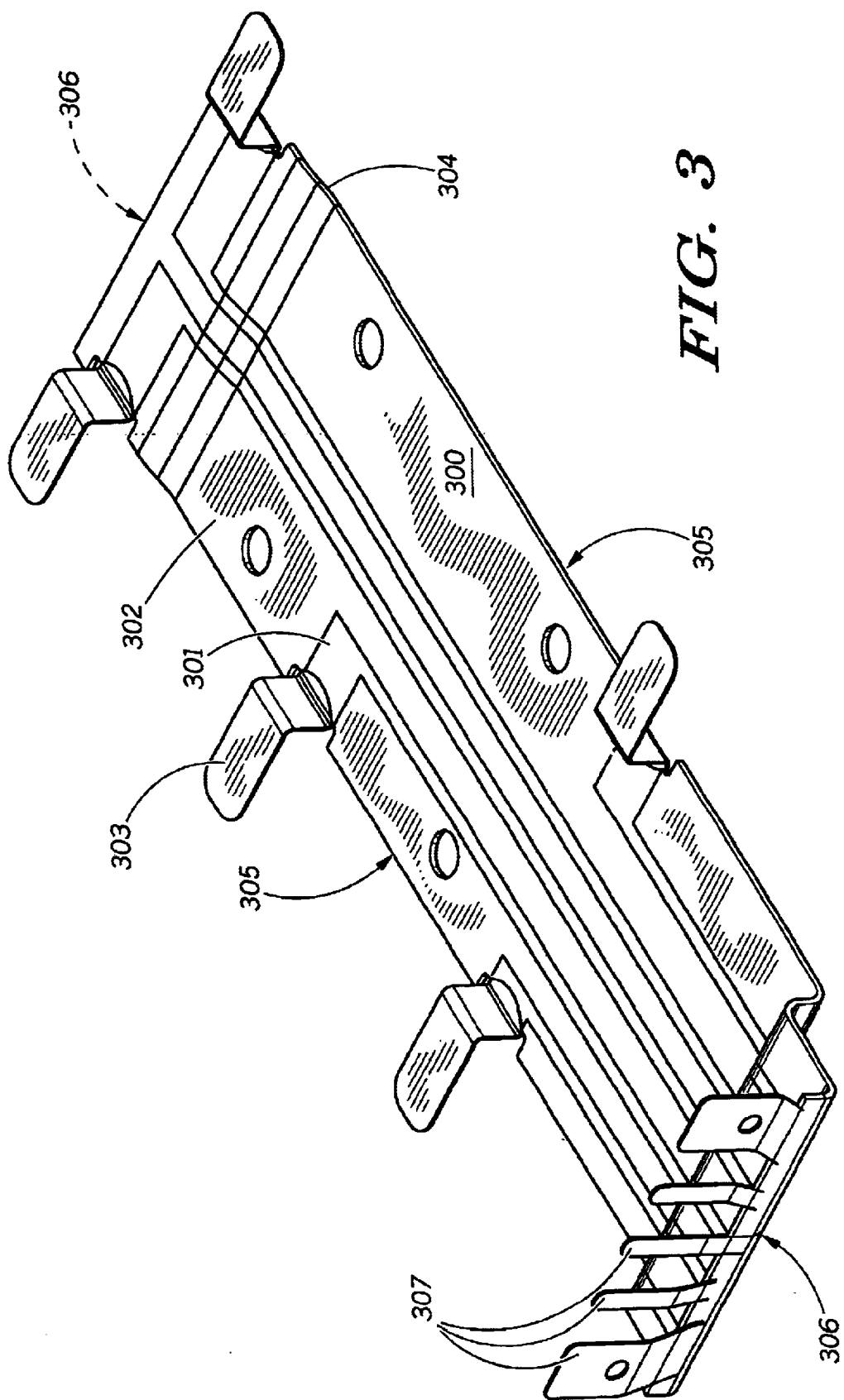
FIG. 3 illustrates the bus in accordance with the invention.

Referring now to FIG. 3, illustrated therein is the bus portion 300 of the invention. The bus 300 is a flexible circuit, preferably constructed of Kapton encapsulated metal conductive traces, e.g. 301. Such flexible circuits are known in the art, as is described in U.S. Pat. No. 6,153,834. The traces 301 extend beyond the Kapton 302, thereby forming metal tabs 303 that may be welded to. The bus 300 optionally includes folds 304 to accommodate the particular battery cell structure. The bus 300 of this circuit has a width 305 of no more than two inches, due to the overall structure of the invention. The length 306 of the bus is less than the sum of the diameters of cells across which it spans. Terminals 307 are provided that facilitate coupling to a printed circuit board.

Figure 4:
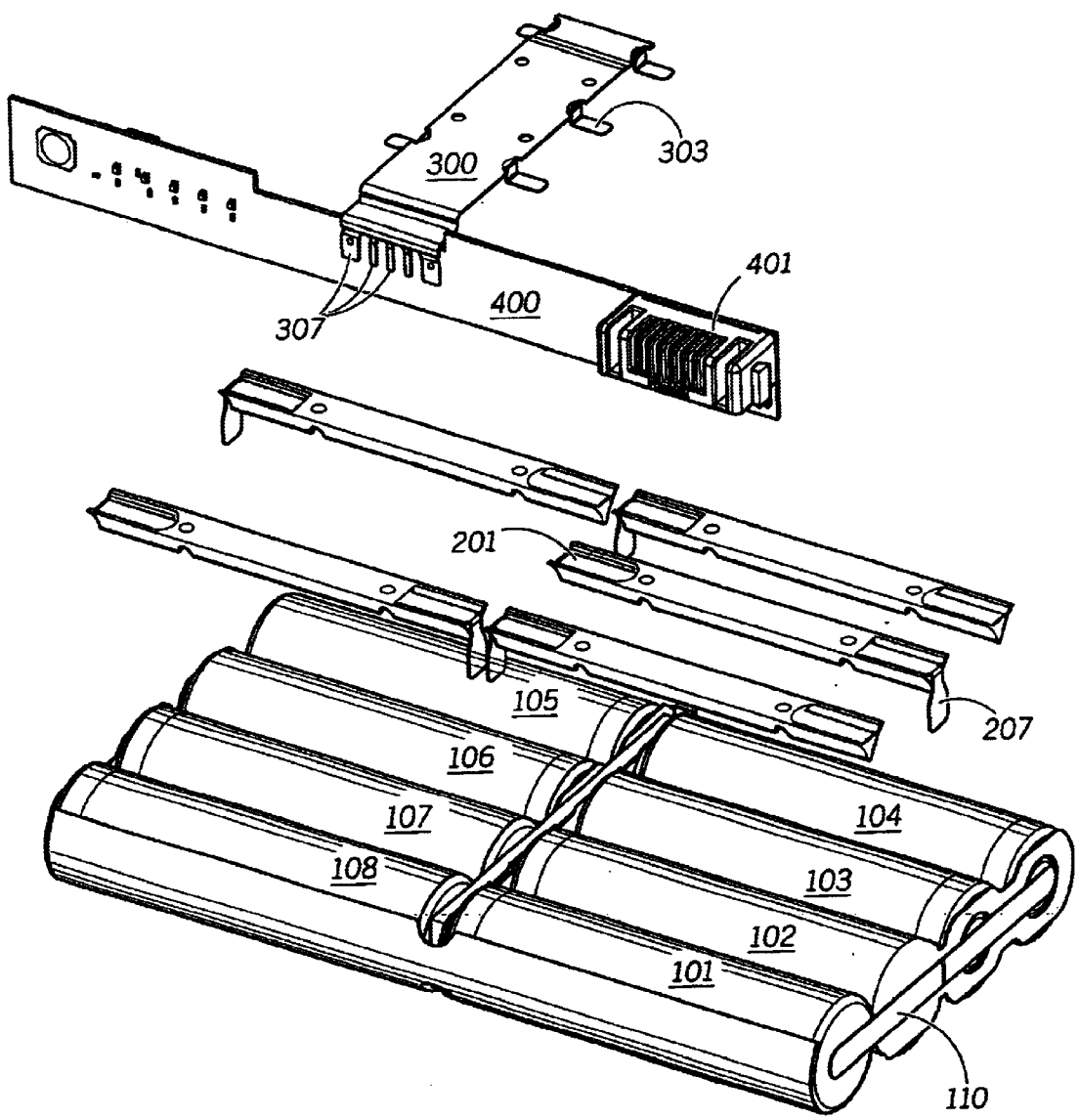
FIG. 4 illustrates an exploded view of a cell arrangement with the components of the interconnect structure in accordance with the invention.

Referring now to FIG. 4, illustrated therein is an exploded view of a cell arrangement 101–108 with the components of the interconnect structure in accordance with the invention. The ultimate goal of the invention is to connect the cells 101–108 to a printed circuit board 400. The printed circuit board includes conductive traces and associated circuitry, which may include battery protection circuits, microprocessor circuits, fuel gauging circuits and charging circuits. The conductive traces facilitate, among other things, delivery of power from the cells 101–108 to a connecter 401 that ultimately delivers the power to the host device.

As illustrated, the terminals 307 of the bus 300 are electrically coupled to the printed circuit board 400. The preferred method of coupling is by way of a hot bar welding process, although soldering is an alternative, for example in a reflow process. The bus 300 is oriented such that the tabs 303 align with the metal tabs 201 of the runners. The runners are aligned such that the perpendicular members, e.g. 207, align with each of the metal tabs 110 on the cell terminals.

Figure 5:
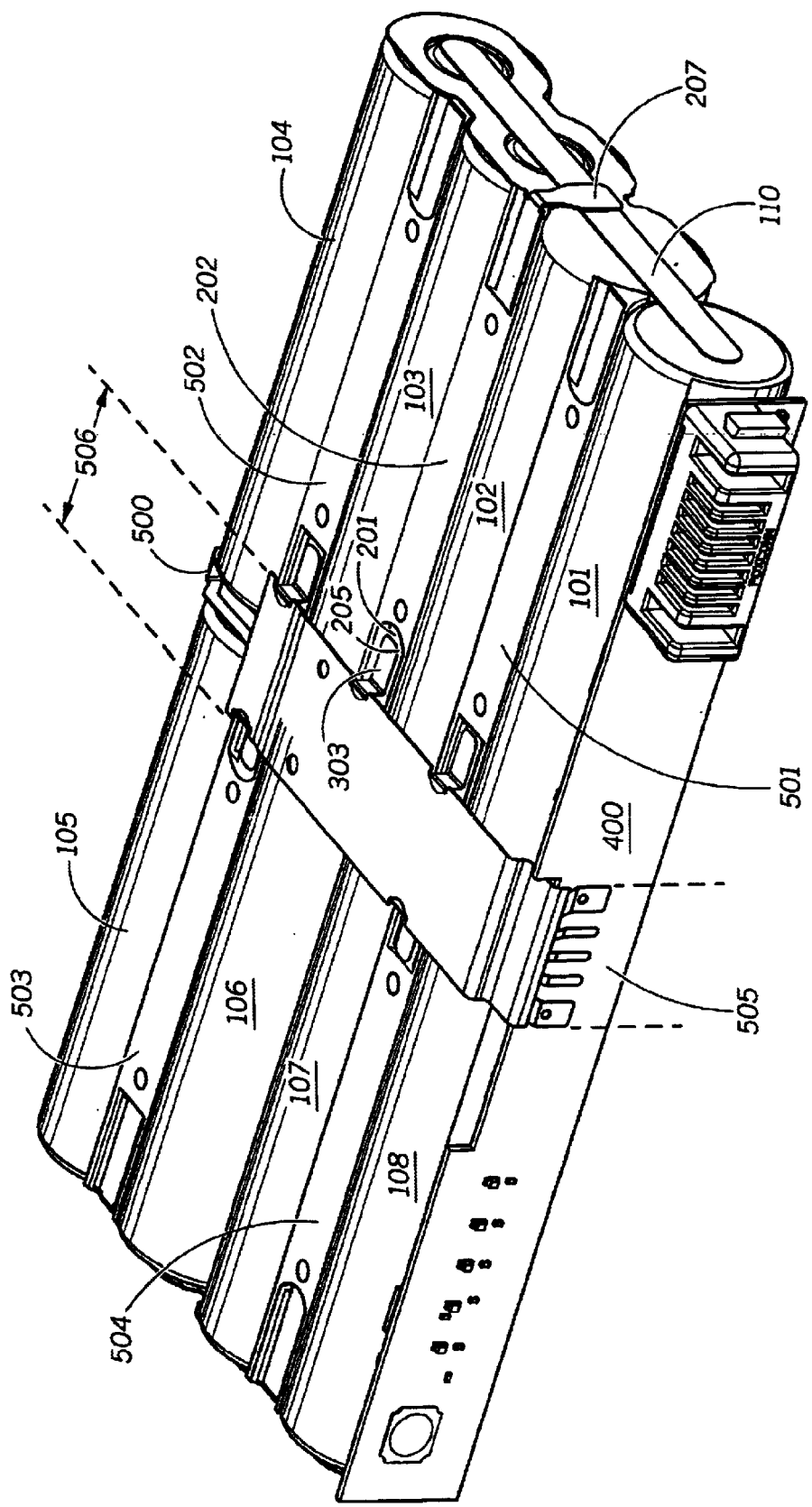
FIG. 5 illustrates a rechargeable battery assembly with an interconnect structure in accordance with the invention.

Referring now to FIG. 5, illustrated therein is a rechargeable battery assembly with an interconnect structure in accordance with the invention. The bus tabs 303 have been welded to the runner metal tabs 201 through the apertures 205 in the plastic casing 202. The perpendicular tabs 207 have each been welded to the battery tabs 110. The welding process is preferably carried out by way of spot welding, although pinch welding and soldering will also work.

The plastic casings 202 have been seated between adjoining cells 102,103. Note that in addition to facilitating a welding process, thereby improving efficiency, the plastic casings 102 also provide an extra insulating function. The insulating function prevents tabs from shorting to either tabs or other cell housings. Note also that the bus 300 is generally the most expensive component of the circuit, as Kapton is very robust, patented product of the DuPont company and tends to be rather expensive. The structure shown in FIG. 5 greatly reduces cost over prior art solutions in that the bus is kept less than two inches in width. The length is less than the diameter of the parallel cells (i.e. the length of the bus 300 is less than the combined widths of cells 101,102,103, 104). Note also that the bus 300 covers the "fold" in the cells, as a folded tab 500 couples cells 104 and 105. The bus 300 is thus positioned down the center of the parallel combinations of end to end cells in the cell configuration.

While FIG. 5 is an exemplary embodiment, it represents an embodiment that will accommodate many laptop batteries. The structure includes eight 18–650 cells, in serial combinations of pairs of parallel cells. Five runners 202, 501–504 are used, each coupled to a tab on the bus 300. The bus 300 runs across the interior 506 of the cells 101–108, thereby coupling to a center portion 505 of the printed circuit board 400. The net result is a low-cost, high reliability interconnect system that may be implemented in mass production facilities.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the exemplary embodiment utilized eight 18–650 cells in a series parallel combination, it will be clear that numerous other combinations of cell numbers and configurations may also employ the invention.

What is claimed is:

1. A rechargeable battery assembly, comprising:
   a. a plurality of rechargeable cells, wherein a subset of the plurality of rechargeable cells has been electrically coupled with a plurality of flexible metal tabs;
   b. a plurality of runners, each runner comprising:
      i. a metal tab; and
      ii. a plastic housing having apertures therein, the plastic housing encompassing the metal tab;
   c. a flexible circuit member; and
   d. a printed circuit board;
   wherein the plurality of rechargeable cells are arranged in parallel rows of two cells,
   the two cells being disposed end to end;
   further wherein the flexible circuit member is disposed generally along the center of the parallel rows; and
   further wherein the plurality of runners is electrically coupled to the flexible circuit member, which is electrically coupled to the printed circuit board.

2. The assembly of claim 1, wherein the plastic housing has a triangular cross section.

3. The assembly of claim 2, wherein two sides of the triangular cross section comprise concave curvatures.

4. The assembly of claim 3, wherein the flexible circuit member comprises protruding tabs for coupling to the runners and terminals for coupling to the printed circuit board; further wherein the protruding tabs of the flexible circuit member couple to the metal tabs of the runner through the aperture in the runner.

5. The assembly of claim 4, wherein the protruding tabs are coupled to the runners by a method selected from the group consisting of spot welding, soldering and pinch welding.

6. The assembly of claim 5, wherein the terminals are coupled to the printed circuit board by a process selected from the group consisting of soldering and hot bar welding.

7. The assembly of claim 6, wherein the flexible circuit member is less than two inches in width, and less than a sum of the diameters of the parallel rows in length.

8. The assembly of claim 7, wherein the plurality of rechargeable cells comprises eight cells, disposed in four parallel rows of two end to end cells.

9. The assembly of claim 8, wherein the plurality of runners comprises five runners.

10. The assembly of claim 9, wherein the plurality of rechargeable cells comprise 18–650, lithium-ion cells.

* * * * *